US009274655B2

(12) United States Patent
Lee et al.

(10) Patent No.: US 9,274,655 B2
(45) Date of Patent: Mar. 1, 2016

(54) METHOD OF DETECTING A TOUCH POSITION, TOUCH SUBSTRATE AND DISPLAY APPARATUS HAVING THE TOUCH SUBSTRATE

(75) Inventors: Il-Ho Lee, Hwaseong-si (KR);
Hyeon-Yong Jang, Hwaseong-si (KR);
Seong-Mo Hwang, Seongnam-si (KR);
Jae-Jin Pyun, Hwaseong-si (KR);
Moon-Jung Baek, Suwon-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 940 days.

(21) Appl. No.: 13/348,061

(22) Filed: Jan. 11, 2012

(65) Prior Publication Data

US 2012/0313888 A1    Dec. 13, 2012

(30) Foreign Application Priority Data

Jun. 9, 2011    (KR) .............................. 2011-0055394

(51) Int. Cl.
*G09G 5/00*    (2006.01)
*G06F 3/044*    (2006.01)
*G06F 3/045*    (2006.01)

(52) U.S. Cl.
CPC ............... *G06F 3/044* (2013.01); *G06F 3/045* (2013.01); *G06F 2203/04103* (2013.01); *G06F 2203/04112* (2013.01)

(58) Field of Classification Search
CPC ....... G06F 3/0414; G06F 3/044; G06F 3/047; G06F 2203/04111; G06F 3/045; G06F 2203/04112
USPC .................................. 345/173–178; 178/18.06
See application file for complete search history.

(56) References Cited

U.S. PATENT DOCUMENTS

| 8,717,330 | B2 * | 5/2014 | Lu et al. .................... 345/174 |
| 2010/0184485 | A1 * | 7/2010 | Kim .......................... 455/566 |
| 2011/0037721 | A1 * | 2/2011 | Cranfill et al. .............. 345/174 |
| 2011/0057900 | A1 * | 3/2011 | Huang et al. ................ 345/174 |
| 2011/0115738 | A1 * | 5/2011 | Suzuki et al. ............... 345/173 |
| 2011/0148809 | A1 * | 6/2011 | Kanehira et al. ............ 345/174 |
| 2011/0227864 | A1 * | 9/2011 | Baek .......................... 345/174 |
| 2012/0162122 | A1 * | 6/2012 | Geaghan .................... 345/174 |
| 2012/0212434 | A1 * | 8/2012 | Bluemler et al. ........... 345/173 |

* cited by examiner

*Primary Examiner* — Jennifer Nguyen
(74) *Attorney, Agent, or Firm* — F. Chau & Associates, LLC (57) ABSTRACT

Method of detecting a touched position on a touch display of a display apparatus includes determining an amount of an electrical charge generated by a touch on the touch display panel of a display apparatus, determining a difference between the amount of the electrical charge generated from the touch and an amount of a reference electrical charge and comparing this difference to a threshold value, detecting the position of the touch if it is determined that the difference between the amount of the electrical charge generated from the touch and the amount of the reference electrical charge is substantially the same as or larger than the threshold value and detecting the touched position using a pressure according to the touch if it is determined that difference between the amount of the electrical charge and the amount of the reference voltage is smaller than the threshold value.

14 Claims, 10 Drawing Sheets

METHOD OF DETECTING A TOUCH POSITION, TOUCH SUBSTRATE AND DISPLAY APPARATUS HAVING THE TOUCH SUBSTRATE

CROSS-REFERENCE TO RELATED APPLICATION

This application claims priority under 35 U.S.C. §119 to Korean Patent Application No. 10-2011-55394, filed on Jun. 9, 2011, the disclosure of which is hereby incorporated by reference herein in its entirety.

BACKGROUND OF THE INVENTION

1. Technical Field

Example embodiments of the present invention relate to a method of detecting a touch position, a touch substrate and a display apparatus having the touch substrate. More particularly, example embodiments of the present invention relate to a method of detecting a touch position with a hybrid type, a touch substrate and a display apparatus having the touch substrate.

2. Description of the Related Art

Recently, a display apparatus including a touch display panel, to which a signal is input by a pen, a finger and so on without an input device such as a remote controller, a keypad and so on, has been used.

The touch display panel may be divided into, for example, a capacitive type, a resistive type, an optical type, and so on.

In the conventional capacitive type, a finger, stylus pen, and so on are touched on a touch display panel as touch means, an amount of an electrical charge changed is detected to detect a touch position. The conventional capacitive type may be beneficial for a smooth touch action because a small amount of power is enough for touching. However, in the conventional capacitive type, since the touch means should generate the change in the amount of the electrical charge, the touch means may be limited.

In the conventional resistive type, a finger, stylus pen and so on may be pressed on a touch display panel as the touch means, and thus a short between an upper electrode and a lower electrode may be generated to detect the touched position. In the conventional resistive type, the touch means are not limited but the smooth touch action is hard because a relatively larger pressure may be required to be applied on the touch display panel.

SUMMARY OF THE INVENTION

Example embodiments of the present invention provide a method of detecting a touch position with a hybrid type suitable for a user.

Example embodiments of the present invention also provide a touch substrate having a hybrid type suitable for a user.

Example embodiments of the present invention further also provide a display apparatus having the touch substrate.

According to an example embodiment of the present invention, a method of detecting a touch position is provided. In the method, the touched position is detected using an amount of an electrical charge according to a touch generated on a touch display panel. The touched position is detected using a pressure according to the touch.

In accordance with an example embodiment of the present invention, a method of detecting a touched position on a touch display of a display apparatus is provided. The method includes determining an amount of an electrical charge generated by a touch on the touch display panel of a display apparatus, determining a difference between the amount of the electrical charge generated from the touch and an amount of a reference electrical charge and comparing this difference to a threshold value, detecting the position of the touch if it is determined that the difference between the amount of the electrical charge generated from the touch and the amount of the reference electrical charge is substantially the same as or larger than the threshold value and detecting the touched position using a pressure according to the touch if it is determined that difference between the amount of the electrical charge and the amount of the reference voltage is smaller than the threshold value.

In an example embodiment, a voltage may be read out from an electrode part of the touch display panel. A touching error may be detected based on the voltage.

In an example embodiment, in reading out the voltage, a first electrode part extended in a first direction on the touch display panel may be driven. A second electrode part extended in a second direction crossing the first direction may be read out.

In an example embodiment, in detecting the touching error, the voltage may be compared with a reference voltage, so that the touching error may be detected.

In an example embodiment, in detecting the touched position using the amount of the electrical charge, the amount of the electrical charge may be detected based on the read-out voltage. The touched position may be detected when a difference between the amount of the electrical charge and an amount of a reference electrical charge is larger than or equal to a threshold value.

In an example embodiment, in detecting the touched position using the pressure, when a difference between the amount of the electrical charge and an amount of a reference electrical charge is smaller than the threshold value, a current may be read out from the electrode part of the touch display panel. A resistance corresponding to the read-out current and the read-out voltage may be obtained. The touched position may be detected based on the resistance.

In an example embodiment, in detecting the touched position using the pressure, intensity of the pressure may be detected based on the resistance.

According to an example embodiment of the present invention, a touch substrate includes a base substrate, a first electrode part, a second electrode part and a pressure detecting element. The first electrode part is disposed on a first surface of the base substrate, and extends in a first direction. The second electrode part extends in a second direction crossing the first direction. The pressure detecting element is disposed in a crossing area between the first electrode part and the second electrode part.

In an example embodiment, the pressure detecting element may be a quantum tunneling composite (QTC).

In an example embodiment, the pressure detecting element may include a transparent material.

In an example embodiment, the first electrode part may include a plurality of first main electrodes extending in the first direction and a plurality of first connecting electrodes connecting the first main electrodes adjacent to each other in the first direction. The second electrode part may include a plurality of second main electrodes extending in the second direction and a plurality of second connecting electrodes connected to the second main electrodes adjacent to each other in the second direction, crossing the first connecting electrode and integrally formed with the second main electrodes.

According to an example embodiment of the present invention, a display apparatus includes a touch display panel and a controller. The touch display panel includes a touch substrate including a base substrate, a first electrode part disposed on a first surface of the base substrate and extending in a first direction, a second electrode part extending in a second direction crossing the first direction and a pressure detecting element disposed in a crossing area between the first electrode part and the second electrode part. The controller is connected to the touch display panel and detecting a touched position generated on the touch display panel.

In an example embodiment, the controller may include an error detecting part, a first touch detecting part and a second detecting part. The error detecting part may be adapted to compare a voltage due to a touch with a reference voltage, so that a touching error may be detected. The first touch detecting part may be adapted to detect the touched position using an amount of an electrical charge based on the voltage. The second touch detecting part may be adapted to map the voltage and a current due to the touch to a look-up table, so that the touched position may be detected.

In accordance with an example embodiment of the present invention, a display apparatus is provided. The display apparatus includes a touch display panel having an array substrate including a first base substrate and a plurality of pixels formed on the first base substrate, with each of the pixels includes a switching element and a pixel electrode connected to the switching element, a touch substrate including a second base substrate having a first surface and a second surface opposite to the first surface, in which the first surface includes a touch area adapted to receive a touch input and a peripheral area outside of the touch area, a second electrode part disposed on the touch area of the first surface and extending in a second direction crossing the first direction, a pressure detecting element disposed on the touch area of the first surface in a crossing area between the first electrode part and the second electrode part and a wiring electrode part including a first wiring electrode connected to an end of the first electrode part and a second wiring electrode connected to an end of the second electrode part.

The display apparatus further includes a liquid crystal layer disposed between the array substrate and the touch substrate, a protecting substrate disposed over the touch substrate for protecting the touch substrate, a filled layer disposed between the protecting substrate and the touch substrate and adhering the protecting substrate to the touch substrate, a common electrode disposed between the touch substrate and the liquid crystal layer and a controller connected to the touch display panel and detecting a touched position generated on the touch display panel.

According to a method of detecting a touch position, a touch substrate and a display apparatus having the touch substrate, a pressure detecting element having a resistance changed according to a pressure between a first electrode part and a second electrode part, so that a touched position may be detected according to an amount of an electrical charge or the pressure. Thus, the touched position may be detected regardless of touch means.

In addition, a controller includes a second tactile controlling part controlling intensity of a tactile sensation according to intensity of a touch, so that the intensity of the tactile sensation may be controlled.

BRIEF DESCRIPTION OF THE DRAWINGS

Example embodiments of the present invention can be understood in more detail from the following detailed description taken in conjunction with the accompanying drawings, in which.

DETAILED DESCRIPTION OF THE INVENTION

Hereinafter, example embodiments of the present invention will be explained in detail with reference to the accompanying drawings.

Figure 1:
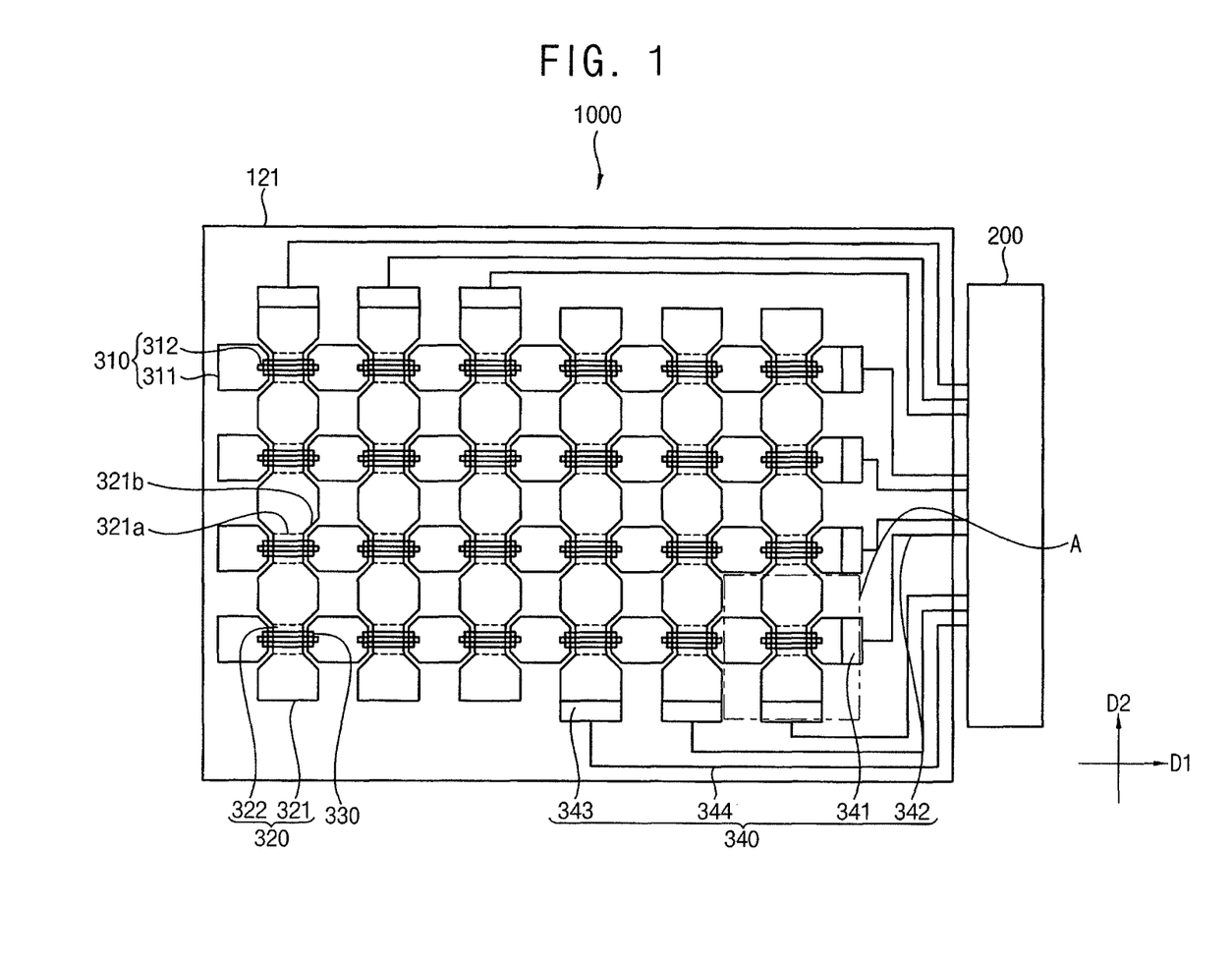
FIG. 1 is a plan view illustrating a display apparatus according to an example embodiment of the present invention.
Figure 2A:
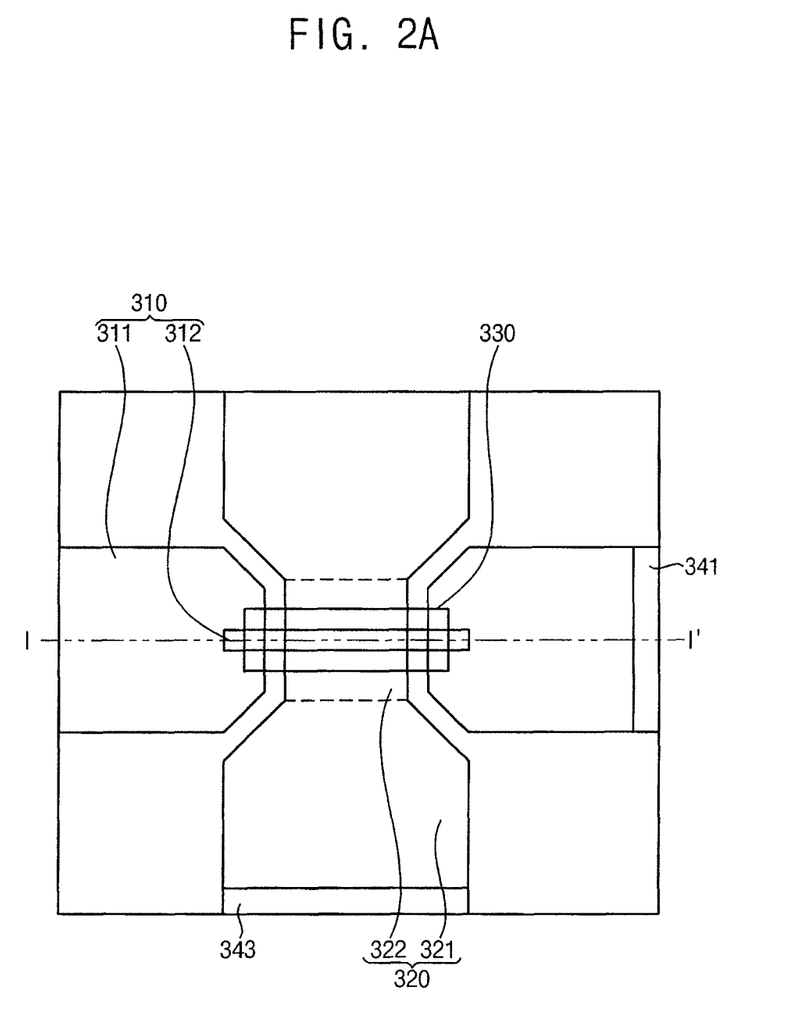
FIG. 2A is an exploded plan view illustrating a portion 'A' of FIG. 1.
Figure 2B:
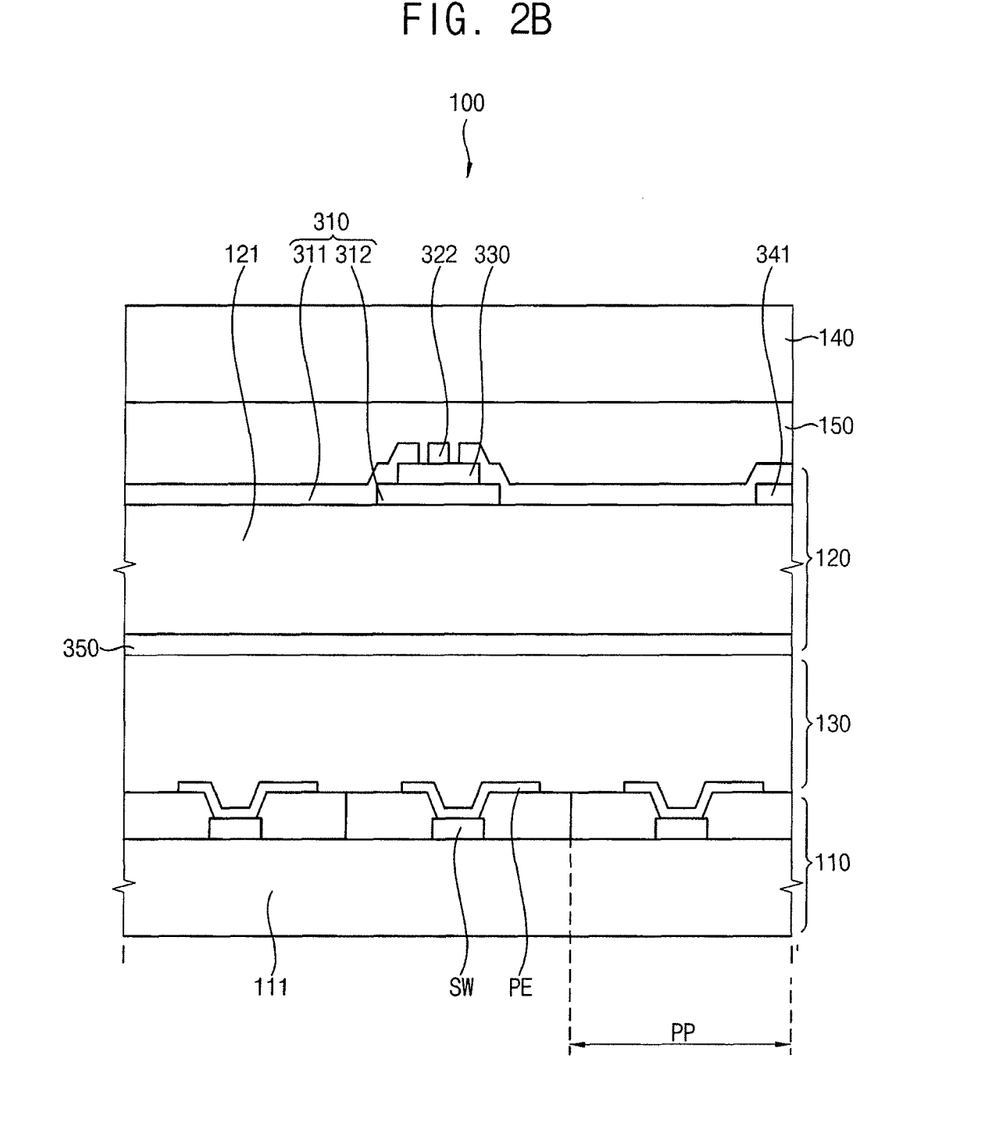
FIG. 2B is a cross-sectional view taken along a line I-I' of FIG. 2A.

FIG. 1 is a plan view illustrating a display apparatus according to an example embodiment of the present invention. FIG. 2A is an exploded plan view illustrating a portion 'A' of FIG. 1. FIG. 2B is a cross-sectional view taken along a line I-I' of FIG. 2A.

Referring to FIG. 1 to FIG. 2B, a display apparatus 1000 includes, for example, a touch display panel 100 and a controller 200. The touch display panel 100 includes, for example, an array substrate 110, a touch substrate 120 and a liquid crystal layer 130.

The array substrate 110 includes, for example, a first base substrate 111 and a plurality of pixels PP formed on the first base substrate 111. Each of the pixels PP includes, for example, a switching element SW and a pixel electrode PE electrically connected to the switching element SW.

The touch substrate 120 includes, for example, a second base substrate 121, a first electrode part 310, a second electrode part 320, a pressure detecting element 330, a wiring electrode part 340 and a common electrode 350. The second base substrate 121 includes, for example, a first surface and a second surface opposite to the first surface, and the second surface of the second base substrate 121 faces the first substrate 111. The first surface is divided into a touch area in which a touch is inputted and a peripheral area outside of the touch area.

The first electrode part 310, the second electrode part 320 and the pressure detecting element 330 are disposed in the touch area of the first surface, and the wiring electrode part 340 is disposed in the peripheral area of the first surface.

The first electrode part 310 is disposed on the first surface of the second base substrate 121, and extends in a first direction D1. The first electrode part 310 includes, for example, a plurality of first main electrodes 311 and a plurality of connecting electrodes 312. Each of the connecting electrodes 312 connects the first main electrodes 311 adjacent to each other. The first connecting electrode 312 may have a width, for example, substantially the same as or smaller than a width of the first main electrode 311. Alternatively, the first connecting electrode 312 may have a width greater than a width of the first main electrode 311.

The second electrode part 320 is disposed on the first surface of the second base substrate 121, and extends in a second direction D2 crossing the first direction D1. The second electrode part 320 includes, for example, a plurality of second main electrodes 321 and a plurality of second connecting electrode 322. Each of the second connecting electrodes 322 connects the second main electrodes 321 adjacent to each other. The second connecting electrode 322 may have a width, for example, substantially the same as or smaller than a width of the second main electrode 321. Alternatively, the second connecting electrode 322 may have a width greater than a width of the second main electrode 321.

The first main electrode 311 is disposed between the second electrode parts 320 adjacent to each other in a plan view. For example, the first main electrode 311 is disposed between the second connecting electrodes 322 adjacent to each other in the first direction D1 in a plan view. The second main electrode 321 is disposed between the first electrode parts 310. For example, the second main electrode 321 is disposed between the first connecting electrodes 312 adjacent to each other in the second direction D2 in a plan view.

For example, when the first main electrode 311 has the width substantially the same as a width of the first connecting electrode 312, the first main electrode 311 may have a rectangular shape. Alternatively, when the first main electrode 311 has the width larger than a width of the first connecting electrode 312, the first main electrode 311 may have an end-tapered shape. For example, an end of the first main electrode 311 connected to the first connecting electrode 312 is tapered. The second main electrode 321 may have substantially a same shape as a shape of the first main electrode 311 except in an extending direction. First sides 321a of ends of the second main electrodes 321 adjacent to each other are disposed substantially parallel to sides of the first connecting electrode 312, but second sides 321b of the ends of the second main electrodes 321 adjacent to each other are disposed substantially parallel to sides of the first main electrode 311. Thus, although the first main electrode 311 is simultaneously formed with the second electrode part 320, the first main electrode 311 is insulated from the second electrode part 320. It is noted that alternatively, for example, the second main electrode and the first main electrode may have a different shape from one another including in an extending direction.

The first main electrode 311 and the second main electrode 321 may each include, for example, a transparent conductive oxide (TCO). For example, the TCO may include indium-zinc-oxide (IZO), indium-tin-oxide (ITO), fluorine doped tin oxide (FTO), aluminum doped zinc oxide (AZO), or gallium doped zinc oxide (GZO).

The first connecting electrode 312 is separately formed from the first main electrode 311. The first connecting electrode 312 includes a metal material. For example, the metal material may include gold (Au), silver (Ag), copper (Cu), palladium (Pd), platinum (Pt), nickel (Ni), aluminum (Al) or alloys thereof.

However, the second connecting electrode 322 may be, for example, integrally formed with the second main electrode 321. The second connecting electrode 322 includes, for example, a material substantially the same as a material of the second main electrode 321. Thus, the second electrode 322 may include the TCO.

A crossing area between the first electrode part 310 and the second electrode part 320 affects a touch resolution of the touch display panel 100. As the crossing area increases, the touch resolution may increase. The touch resolution may be substantially the same as or smaller than a display resolution according to the pixel PP displaying an image. Thus, as described in FIG. 2, one crossing area may correspond to the plurality of pixels PP.

The pressure detecting element 330 includes variable resistance material whose resistance is changed according to the intensity of a pressure. The variable resistance material may include, for example, a transparent material. The variable resistance material may be, for example, quantum tunneling composite (QTC). The QTC is composite material of, for example, metals and non-conducting elastomeric binder. When pressure is not applied, the metals are spaced apart from each other not to conduct electricity. However, when pressure is applied, the metals move closer, and the metals may tunnel through the non-conducting elastomeric binder (namely, the insulator). The QTC may be in the form of, for example, pills or sheets in accordance with exemplary embodiment of the present inventive concept. QTC pills may be in the form of tiny little pieces of the QTC material. In an embodiment, the sheets may be composed of, for example, one layer of QTC, one layer of a conductive material, and a third layer of a plastic insulator. Alternatively, for example, the pressure detecting element 330 may include other variable resistance materials such as carbon composites consisting of polymers containing carbon (e.g., resistive foam).

The pressure detecting element 330 is disposed between the first connecting electrode 312 and the second connecting electrode 322 in the crossing area of the first electrode part 310 and the second electrode part 320. The pressure detecting element 330 is disposed on the first connecting electrode 312 and under the second connecting electrode 322.

The wiring electrode part 340 includes, for example, a first wiring electrode 341 electrically connected to an end of the first electrode part 310, a first wire line 342 disposed between the first wiring electrode 341 and the controller 200 and electrically connecting the first wiring electrode 341 and the controller 200, a second wiring electrode 343 electrically connected to an end of the second electrode part 320, and a second wire line 344 disposed between the second wiring electrode 343 and the controller 200 and electrically connecting the second wiring electrode 343 and the controller 200.

The first and second wiring electrodes 341 and 343 and the first and second wire lines 342 and 344 may include, for example, a same material as a material of the first connecting electrode 312. The first and second wiring electrodes 341 and 343 are formed, for example, on a same layer as the first connecting electrode 312 and are disposed under the first main electrode 311, so that the first and second wiring electrodes 341 and 343 may partially or entirely overlap with the first main electrode 311.

Alternatively, the first and second wiring electrodes 341 and 343 may include, for example, a same material as a material of the first connecting electrode 312, and the first and second wire lines 342 and 344 may include a material different from a material of the first connecting electrode 312. For example, the first and second wire lines 342 and 344 may include a material having a resistance smaller than a resistance of a material of the first and second wiring electrodes 341 and 343.

The common electrode 350 includes, for example, the TCO. The common electrode 350 is disposed on the second surface of the second base substrate 121.

The touch substrate 120 may further include a color filter layer (not shown) having a red filter R displaying red light, a green filter G displaying green light and a blue filter B displaying blue light. The color filter layer may further include a white filter displaying white light. Alternatively, the color filter layer may be formed on the array substrate 110, or may be replaced by a red light source, a green light source and a blue light source.

The liquid crystal layer 130 is disposed between the array substrate 110 and the touch substrate 120, and controls a transmitting rate of light.

The touch display panel 100 may further include, for example, a protecting substrate 140 and a filled layer 150. The protecting substrate 140 is disposed over the touch substrate 120, and protects the touch substrate 120. The protecting substrate 140 may be, for example, a transparent glass or film. The filled layer 150 is disposed between the protecting substrate 140 and the touch substrate 120. The filled layer 150 may include, for example, at least one of an adhesive adhering the protecting substrate 140 to the touch substrate 120, air and a resin.

Figure 3:
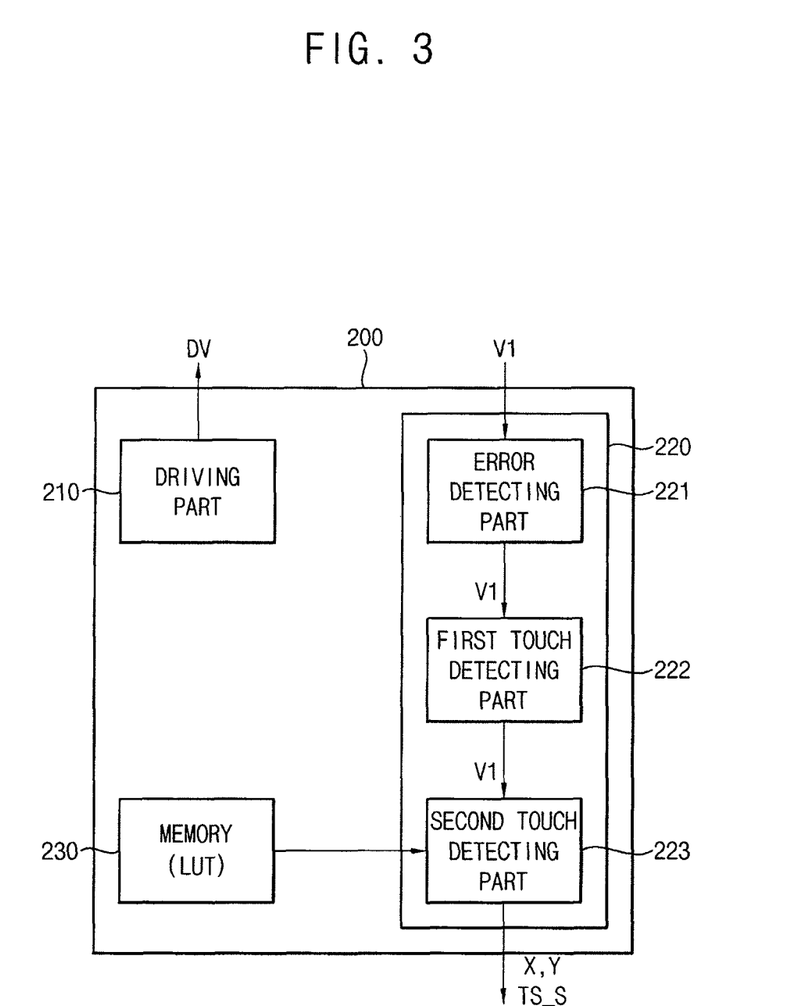
FIG. 3 is a block diagram illustrating a controller of FIG. 1.

FIG. 3 is a block diagram illustrating a controller of FIG. 1.

Referring to FIG. 1 and FIG. 3, the controller 200 includes, for example, a driving part 210, a sensing part 220 and a memory 230. The driving part 210 sequentially provides a driving voltage DV to the second electrodes 320. For example, the driving part 210 sequentially provides the driving voltages DV from the second electrode part 320 of a first side to the second electrode part 320 of a second side opposite to the first side.

The sensing part 220 includes, for example, an error detecting part 221, a first touch detecting part 222 and a second touch detecting part 223. The sensing part 220 sequentially reads out from a third side of the first electrode part 310 to a fourth side of the first electrode part 310 which is opposite to the third side, when one of the second electrode parts 320 is driven. When a touch is input at a first position on the touch substrate 120, the sensing part 220 sequentially reads out from the first electrode part 310 and the sensing part 220 reads out a first voltage V1 from the first electrode part 310 related to the first position.

When the first voltage V1 is read out, the error detecting part 221 compares the first voltage V1 with a reference voltage set to detect a touching error. For example, the error detecting part 221 recognizes the first voltage V1 as a touching error when the first voltage V1 is larger than the reference voltage, and the error detecting part 221 recognizes the first voltage V1 as a voltage for the touch when the first voltage V1 is substantially same as or smaller than the reference voltage.

The first touch detecting part 222 detects an amount of a first electric charge based on the first voltage V1. The first touch detecting part 222 may detect a variation of the amount of the electric charge ($\Delta c$) based on a difference between the amount of first electric charge and an amount of second electric charge which is a reference. Thus, the first touch detecting part 222 detects a Y axis coordinate of the touch based on the second electrode part 320 driven by the driving part 210 and an X axis coordinate of the touch based on the variation of the amount of the electric charge ($\Delta c$).

In addition, the first touch detecting part 222 provides the first voltage V1 to the second touch detecting part 223 when the variation of the amount of the electric charge ($\Delta c$) is zero.

The second touch detecting part 223 receives the first voltage V1 from the first touch detecting part 222. Alternatively, the second touch detecting part 223 may directly receive the first voltage V1 from the error detecting part 221.

When the second touch detecting part 223 receives the first voltage V1, the second touch detecting part 223 detects a first current related to the first position. The second touch detecting part 223 maps the first voltage V1 and the first current to a look-up table including information on the first voltage V1 and the first current to determine a resistance. The second touch detecting part 223 detects the touched position based on the first voltage V1, the first current and the resistance. In addition, the second touch detecting part 223 may detect the intensity of the touch based on the resistance.

The memory 230 stores the look-up table, and provides the look-up table to the second touch detecting part 223.

Figure 4:
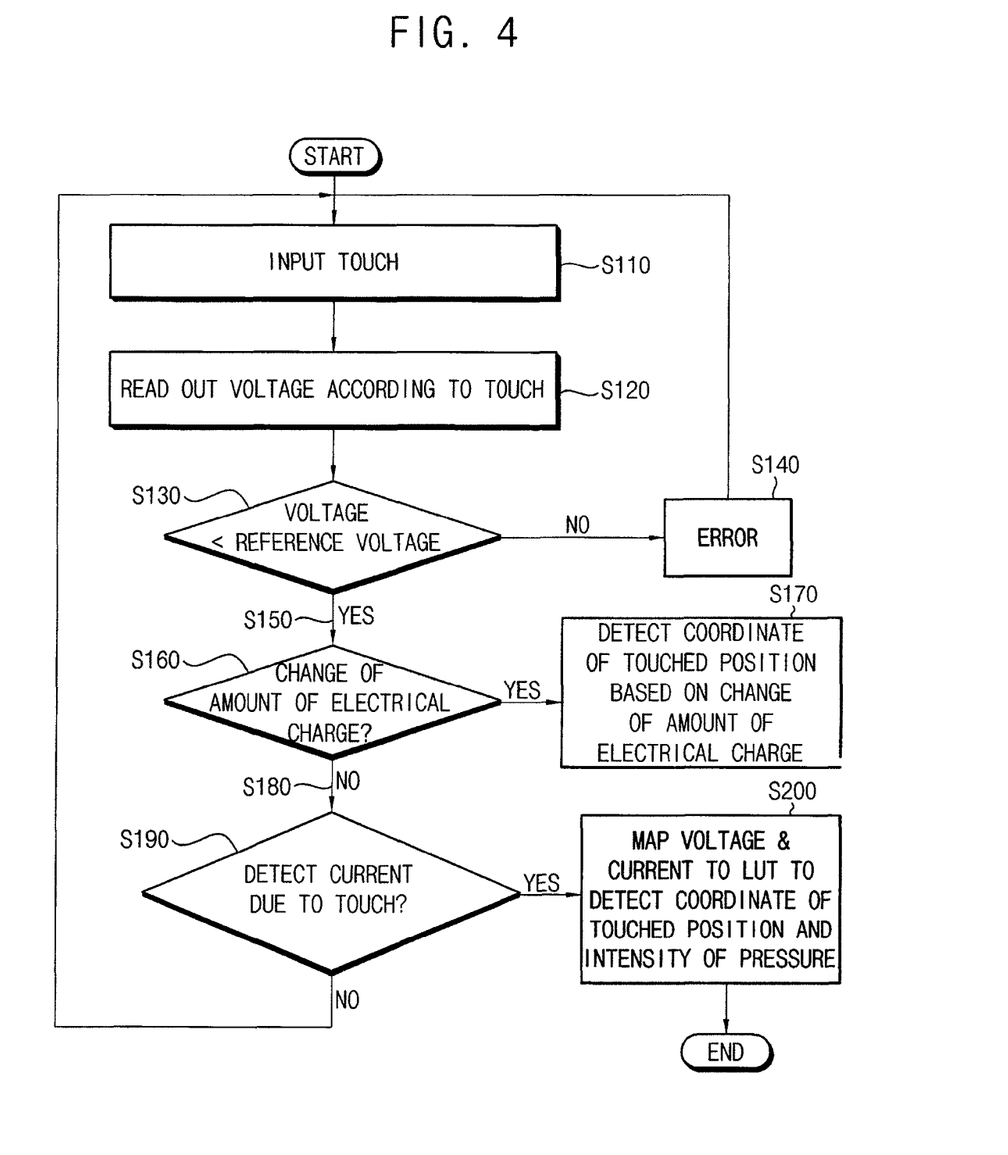
FIG. 4 is a flow chart illustrating a method of detecting a touch position of the display apparatus of FIG. 1.

FIG. 4 is a flow chart illustrating a method of detecting a touched position of the display apparatus of FIG. 1.

First, the driving part 210 sequentially applies a driving voltage DV to the second electrode part 320. The sensing part 220 sequentially reads out from the first electrode parts 310.

Referring to FIG. 3 and FIG. 4, a touch is input through at least a first position of the touch substrate 120 (step 110). The sensing part 220 sequentially reads out from the first electrode parts 310, and senses a voltage from the first electrode part 310 related to the first position (step 120).

The error detecting part 221 of the sensing part 220 compares the voltage with a reference voltage (step 130). The error detecting part 221 recognizes the voltage as a touching error when the voltage is higher than the reference voltage (step 140). The error detecting part 221 recognizes the voltage as the touch when the voltage is lower than the reference voltage, and provides the voltage to the first touch detecting part 222 (step 150).

The first touch detecting part 222 detects whether or not the amount of the electrical charge is changed based on the voltage (step 160). For example, the first touch detecting part 222 detects the amount of the electrical charge based on the voltage, and then detects a difference between the amount of the electrical charge and the amount of the reference electrical charge. When the difference between the amount of the electrical charge and the amount of the reference electrical charge is substantially same as or larger than a threshold value, the first touch detecting part 222 detects coordinates of the first position based on a change of the amount of the electrical charge (step 170). When the difference between the amount of the electrical charge and the amount of the reference electrical charge is smaller than the threshold value, the first touch detecting part 222 provides the voltage to the second touch detecting part 223 (step 180).

When the second touch detecting part 223 receives the first voltage, the second touch detecting part 223 sequentially reads out the first electrodes 310 and detects whether or not a first current is sensed from the first electrodes part 310 related to the first position (step 190). When the first current is sensed, the second touch detecting part 223 maps the first voltage and the first current to the look-up table to detect the coordinates of the first position and the intensity of the touch (step 200). When the first current is not sensed, the second touch detecting part 223 maintains a stand-by state (step 210).

According to the present example embodiment, the pressure detecting element 330 is disposed between the first electrode part 310 and the second electrode part 320, so that the touch may be detected in one of a capacitive type and a pressure detecting type according to the input touch.

Figure 5:
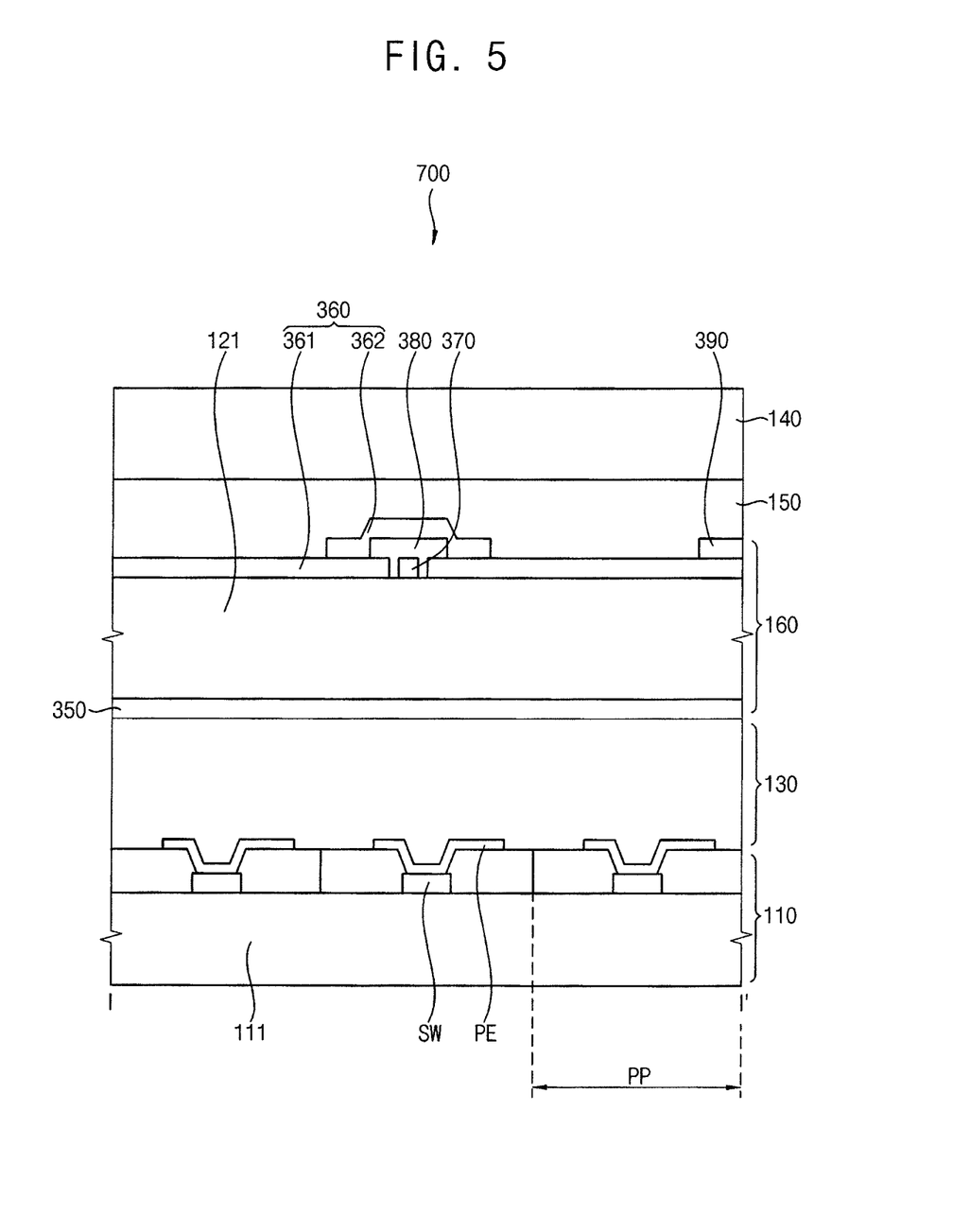
FIG. 5 is a cross-sectional view illustrating a display apparatus according to an example embodiment of the present invention.

FIG. 5 is a cross-sectional view illustrating a display apparatus according to an example embodiment of the present invention.

The display apparatus according to the present example embodiment is substantially the same as the display apparatus according to the previous example embodiment of FIG. 1 except for a touch substrate, and thus the same reference numerals will be used to refer to the same or like parts as those described in the previous example embodiment of FIG. 1 and any repetitive explanation concerning the above elements will be omitted.

Referring to FIG. 5, a display apparatus includes, for example, a touch display panel 700 and a controller 200. The touch display panel 700 includes, for example, an array substrate 110, a touch substrate 160 and a liquid crystal layer 130.

The touch substrate 160 includes, for example, a second base substrate 121, a first electrode part 360, a second electrode part 370, a pressure detecting element 380, a wiring electrode part 390 and a common electrode 350.

The first electrode part 360 is disposed on a first surface of the second base substrate 121, and extends in a first direction D1. The first electrode part 360 includes, for example, a plurality of first main electrodes 361 and a plurality of first connecting electrodes 362 connecting the first main electrodes 361 adjacent to each other in the first direction D1. The first connecting electrode 362 may have, for example, a width substantially the same as or smaller than that of the first main electrode 361. It is also noted that, alternatively, the first connecting electrode 362 may have a width greater than a width of the first main electrode 361.

The second electrode part 370 is disposed on the first surface of the second base substrate 121, and extends in a second direction D2 crossing the first direction D1. The second electrode part 370 includes, for example, a plurality of second main electrodes and a plurality of second connecting electrodes (hereinafter, referring to 370). The second connecting electrode 370 may have, for example, a width substantially the same as or smaller than that of the second main electrode. However, it is also noted that alternatively, the second connecting electrode 370 may have a width greater than a width of the second main electrode 361.

The pressure detecting element 380 is disposed between the first connecting electrode 362 and the second connecting electrode 370 in a crossing area between the first electrode part 360 and the second electrode part 370. The pressure detecting element 380 is disposed on the second connecting electrode 370 and under the first connecting electrode 362.

The wiring electrode part 390 is disposed between each of the first and second electrode parts 360 and 370 and the controller 200, and connects each of the first and second electrode parts 360 and 370 to the controller 200.

The wiring electrode part 390 may include, for example, a same material as a material of the first connecting electrode 362 but example embodiments are not limited thereto. The wiring electrode part 390 is disposed on the first main electrode 361, and the wiring electrode part 390 may partially or entirely overlap with the first main electrode 361.

Figure 6:
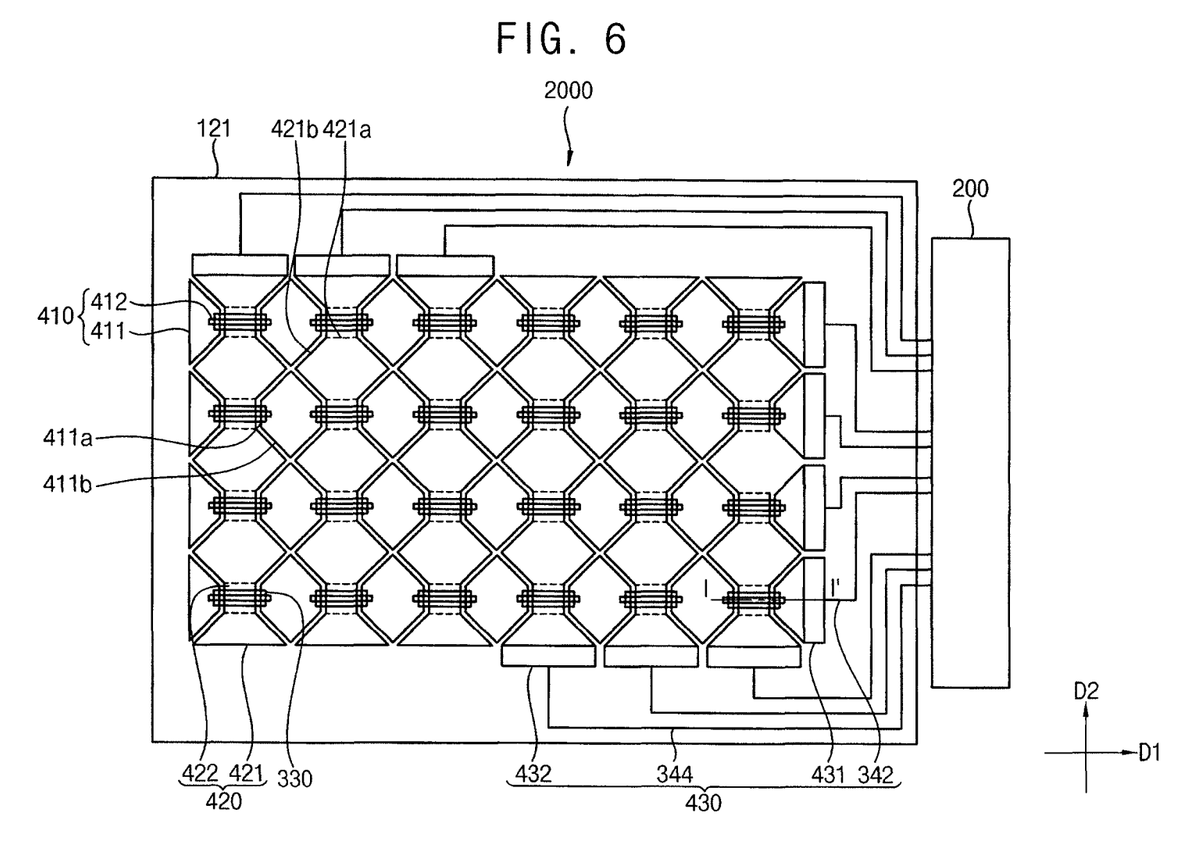
FIG. 6 is a plan view illustrating a display apparatus according to an example embodiment of the present invention.

FIG. 6 is a plan view illustrating a display apparatus according to an example embodiment of the present invention.

The display apparatus according to the present example embodiment is substantially the same as the display apparatus according to the previous example embodiment of FIG. 1 except for shapes of first and second main electrodes, and thus the same reference numerals will be used to refer to the same or like parts as those described in the previous example embodiment of FIG. 1 and any repetitive explanation concerning the above elements will be omitted.

Referring to FIG. 6, a display apparatus 2000 includes, for example, a touch display panel and a controller 200. The touch display panel includes, for example, an array substrate 110, a touch substrate and a liquid crystal layer 130.

The touch substrate includes, for example, a second base substrate 121, a first electrode part 410, a second electrode part 420, a pressure detecting element 330, a wiring electrode part 430 and a common electrode 350. The second base substrate 121 includes, for example, a first surface and a second surface opposite to the first surface, and the second surface of the second base substrate 121 faces the first base substrate 111.

The first electrode part 410, the second electrode part 420, the pressure detecting element 330 and the wiring electrode part 430 are disposed on the first surface of the second base substrate 121.

The first electrode part 410 is disposed on the first surface of the second base substrate 121, and extends in a first direction D1. The first electrode part 410 includes, for example, a plurality of first main electrodes 411 and a plurality of first connecting electrodes 412. Each of the first connecting electrodes 412 connects the first main electrodes adjacent to each other. The first connecting electrode 412 may have, for example, a width substantially the same as or smaller than a width of the first main electrode 411. It is further noted that alternatively, the first connecting electrode 412 may have a width greater than a width of the first main electrode 411.

The second electrode part 420 is disposed on the first surface of the second base substrate 121, and extends in a second direction D2 crossing the first direction D1. The second electrode part 420 includes a plurality of second main electrodes 421 and a plurality of second connecting electrodes 422. Each of the second connecting electrodes 422 connects the second main electrodes 421 adjacent to each other. The second connecting electrode 422 may have, for example, a width substantially the same as or smaller than a width of the second main electrode 421. Also, the second connecting electrode 422 may alternatively have a width greater than a width of the second main electrode 421.

For example, the first main electrode 411 may have a hexagonal shape. It is noted that the shape of the first main electrode 411 is not limited thereto and that the shape of first main electrode 411 may be varied. The first main electrode 411 may include, for example, first sides 411a connected to the first connecting electrode 412 and second sides 411b connected to the first sides 411a. The first sides 411a of each of the first main electrodes 411 adjacent to each other are substantially parallel to the second connecting electrodes 422. The first sides 411a of each of the first main electrodes 411 adjacent to each other, also face each other. The second sides 411b of the first main electrode 411 are substantially parallel to the second sides 421b of the second main electrode 421.

The second main electrode 421 may have, for example, a shape substantially the same as a shape of the first main electrode 411 excepting for in an extending direction but exemplary embodiments of the present invention are not limited thereto. First sides 421a of the second main electrodes 421 adjacent to each other are disposed substantially parallel to the first connecting electrode 421. The first sides 421a of the second main electrodes 421 adjacent to each other, also face each other. Thus, although the first main electrode 411 is simultaneously formed with the second electrode part 420, the first main electrode 411 may be insulated from the second electrode part 420.

The wiring electrode part 430 includes, for example, a first wiring electrode 431 electrically connected to an end of the first electrode part 410, a first wire line 342 disposed between the first wiring electrode 431 and the controller 200 and electrically connecting the first wiring electrode 431 to the controller 200, a second wiring electrode 432 electrically connected to an end of the second electrode part 420, and a second wire line 344 disposed between the second wiring electrode 432 and the controller 200 and electrically connecting the second wiring electrode 432 to the controller 200.

According to the present example embodiment, the first and second main electrodes 411 and 421 have the hexagonal shape. Thus, spaces between the first electrode part 410 and the second electrode part 420 in a plan view decrease, so that a touch resolution of the touch display panel may increase. It is noted that the shapes of the first main electrodes 411 and the second main electrodes 421 are not limited thereto and that the shape of first main electrodes 411 and the second main electrodes 421 may be varied.

Figure 7:
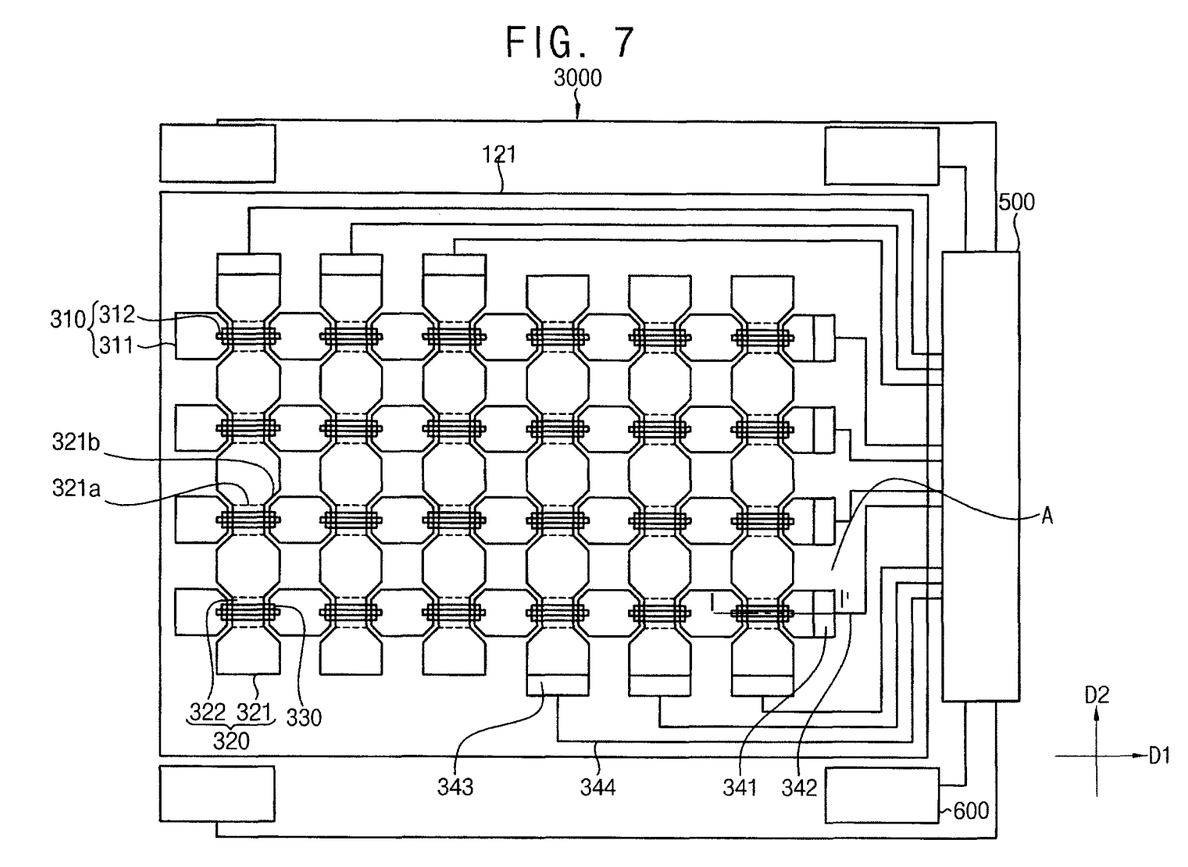
FIG. 7 is a plan view illustrating a display apparatus according to an example embodiment of the present invention.
Figure 8:
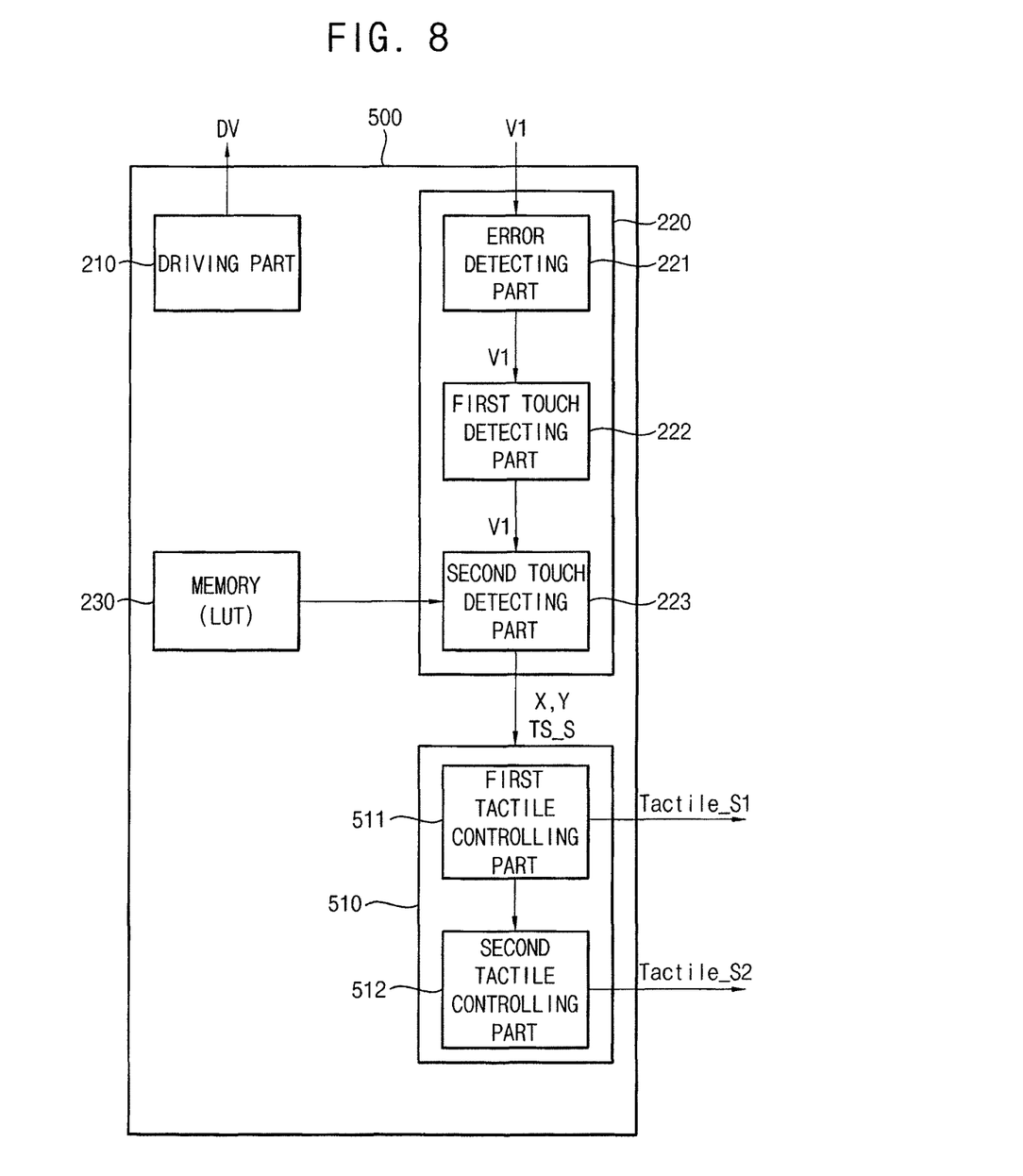
FIG. 8 is a block diagram illustrating a controller of FIG. 7.

FIG. 7 is a plan view illustrating a display apparatus according to an example embodiment of the present invention. FIG. 8 is a block diagram illustrating a controller of FIG. 7.

The display apparatus according to the present example embodiment is substantially the same as the display apparatus according to the previous example embodiment of FIG. 1 except for a tactile generator, and thus the same reference numerals will be used to refer to the same or like parts as those described in the previous example embodiment of FIG. 1 and any repetitive explanation concerning the above elements will be omitted.

Referring to FIG. 7 and FIG. 8, a display apparatus 3000 includes, for example, a touch display panel, a controller 500 and a plurality of tactile generators 600.

The controller 500 includes, for example, a driving part 210, a sensing part 220, a memory 230 and a tactile part 510.

The tactile part 510 includes, for example, a first tactile controlling part 511 and a second tactile controlling part 512. When a touch is input, the first tactile controlling part 511 generates a first tactile signal Tactile_S1 selecting a tactile generator 600 adjacent to a touched position based on coordinates (X, Y) of the touched position calculated by the sensing part 220, and then provides the first tactile signal Tactile_S1 to the tactile generator 600. Alternatively, the first tactile controlling part 511 may generate the first tactile signal Tactile_S1, and then provide the first tactile signal Tactile_S1 to the second tactile controlling part 512. The second tactile controlling part 512 may generate a second tactile signal Tactile_S2 controlling selected tactile generator 600 to generate a tactile sensation having intensity based on intensity of the touch, and then provide the second tactile signal Tactile_S2 to the tactile generator 600.

The tactile generator 600 may be disposed on a front surface or a rear surface of the touch display panel. For example, the tactile generator 600 may be disposed on an upper surface of a protecting substrate of FIG. 1 or on a rear surface of the array substrate of FIG. 1.

At least one of the tactile generators 600 receives the first and second tactile signals Tactile_S1 and Tactile_S2 from the tactile part 510, and then generates a tactile sensation corresponding to the first and second tactile signals Tactile_S1 and Tactile_S2. For example, the tactile generators 600 may be one of a vibrator motor, a piezoelectric actuator, an electroactive polymer (EAP) and an electrosensory element. When the tactile generator 600 is the vibrator motor, the tactile sensation is a vibration. Thus, the tactile generator 600 may generate the vibration based on the coordinates (X,Y) and the intensity of the touched position.

Alternatively, when the number of the tactile generator 600 is one, the first tactile controlling part 511 may be omitted.

Figure 9:
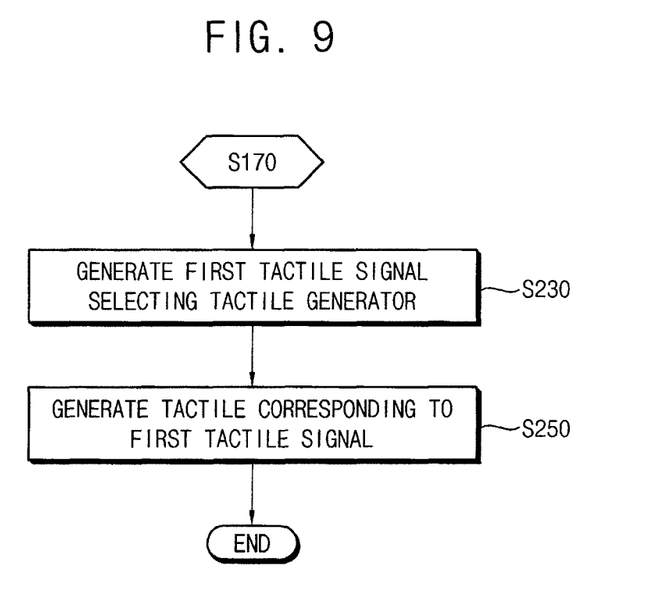
FIG. 9 is a flow chart illustrating a method of generating a tactile according to an amount of an electrical charge in a method of detecting a touched position of the display apparatus of FIG. 7.

FIG. 9 is a flow chart illustrating a method of generating a tactile according to an amount of an electrical charge in the method of detecting a touched position of the display apparatus of FIG. 7.

Referring FIG. 9, when a touch is input as described in FIG. 1 to FIG. 4, the sensing part 220 detects the coordinates (X, Y) of the touched position (step 170).

Then, the first tactile controlling part 511 generates a first tactile signal Tactile_S1 selecting at least one of the tactile generators 600 based on the coordinates (X, Y) of the touched position (step 230).

Selected tactile generator 600 generates a tactile sensation such as, for example, the vibration (step 250).

Figure 10:
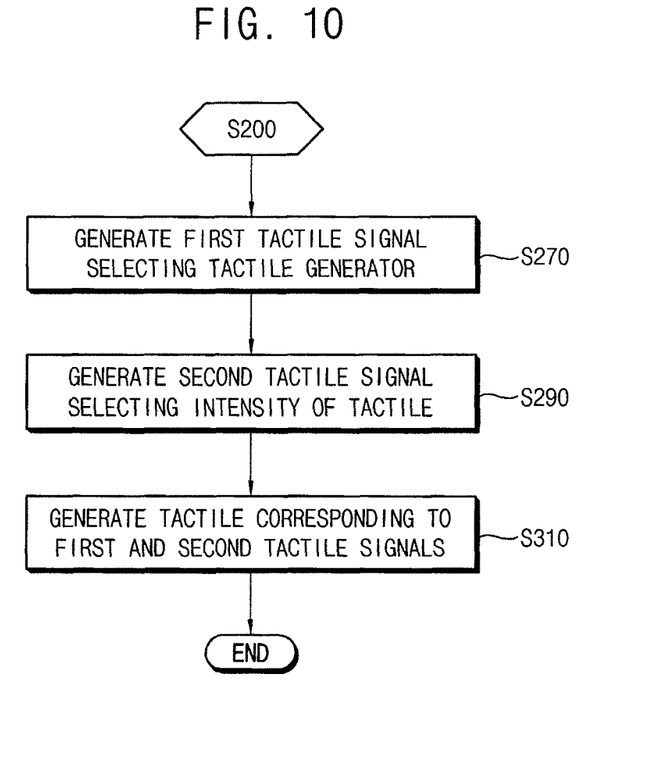
FIG. 10 is a flow chart illustrating a method of generating a tactile according to a pressure in the method of detecting the touched position of the display apparatus of FIG. 7.

FIG. 10 is a flow chart illustrating a method of generating a tactile according to a pressure in the method of detecting the touched position of the display apparatus of FIG. 7.

Referring to FIG. 10, when a touch is input as described in FIG. 1 to FIG. 4, the sensing part 220 detects coordinates (X, Y) of the touched position and intensity TS_S of the touch (step 200).

The first tactile controlling part 511 generates a first tactile signal Tactile_S selecting at least one of the tactile generators 600 based on the coordinates (X, Y) of the touched position (step 270).

The second tactile controlling part 512 generates a second tactile signal Tactile_S selecting the intensity of a tactile sensation, which selected tactile generator 600 generates, based on the intensity TS_S of the touch (step 290).

The selected tactile generator 600 generates the tactile sensation such as, for example, a vibration having a certain intensity (step 310).

According to the present example embodiment, the controller 500 includes, for example, a second tactile controlling part 512, so that the controller 500 may control the intensity of the tactile sensation according to the intensity of the touch.

According to example embodiments of the present invention, a pressure detecting element having a resistance changed according to the pressure is disposed between a first electrode part and a second electrode part, so that a touched position according to an amount of an electrical charge or the pressure may be detected. Thus, the touched position may be detected regardless of a touch means.

A controller includes for example, a second tactile controlling part controlling intensity of a tactile sensation according to the intensity of a touch, so that the intensity of the tactile sensation may be controlled.

Having described example embodiments of the present invention, it is further noted that it is readily apparent to those of reasonable skill in the art that various modifications may be made without departing from the spirit and scope of the invention which is defined by the metes and bounds of the appended claims.

What is claimed is:
1. A touch substrate comprising:
a base substrate;
a capacitive type touch sensor, comprising: a first electrode part disposed on a first surface of the base substrate, and extending in a first direction; and a second electrode part extending in a second direction crossing the first direction;
a pressure detecting type touch sensor, comprising: a pressure detecting element disposed in a crossing area between the first electrode part of the capacitive type touch sensor and the second electrode part of the capacitive type touch sensor; and a controller connected to the capacitive type touch sensor and the pressure detecting type touch sensor, the controller comprising:
an error detecting part adapted to compare a voltage due to a touch with a reference voltage to detect a touching error;
a first touch detecting part adapted to detect the touched position using an amount of an electrical charge based on the voltage; and
a second touch detecting part adapted to map the voltage and a current due to the touch to a look-up table to detect the touched position.

2. The touch substrate of claim 1, wherein the pressure detecting element is a quantum tunneling composite (QTC).

3. The touch substrate of claim 1, wherein the pressure detecting element includes a transparent material.

4. The touch substrate of claim 1, wherein the first electrode part comprises a plurality of first main electrodes extending in the first direction, and a plurality of first connecting electrodes connecting the first main electrodes adjacent to each other in the first direction, wherein the second electrode part comprises a plurality of second main electrodes extending in the second direction, and a plurality of second connecting electrodes connecting the second main electrodes adjacent to each other in the second direction, crossing the first connecting electrode and integrally formed with the second main electrodes.

5. The touch substrate of claim 4, wherein the pressure detecting element is disposed between the first connecting electrode and the second connecting electrode.

6. The touch substrate of claim 1, further comprising:
a first wiring electrode connected to the first electrode part; and
a second wiring electrode connected to the second electrode part, wherein the base substrate includes a touch area adapted to receive a touch input, and a peripheral area outside the touch area, the first and second electrode parts are disposed in the touch area, and the first and second wiring electrodes are disposed in the peripheral area.

7. The touch substrate of claim 1, further comprising a common electrode formed on a second surface of the base substrate opposite to the first surface.

8. A display apparatus comprising:
a touch display panel including a capacitive type touch sensor and a pressure detecting type touch sensor, the touch display panel further comprising:
a touch substrate including a base substrate, a first electrode part of the capacitive type touch sensor disposed on a first surface of the base substrate and extending in a first direction, a second electrode part of the capacitive type touch sensor extending in a second direction crossing the first direction and a pressure detecting element of the pressure detecting type touch sensor disposed in a crossing area between the first electrode part of the capacitive type touch sensor and the second electrode part of the capacitive type touch sensor; and
a controller connected to the touch display panel and detecting a touched position generated on the touch display panel,
wherein the controller comprises:
an error detecting part adapted to compare a voltage due to a touch with a reference voltage to detect a touching error;
a first touch detecting part adapted to detect the touched position using an amount of an electrical charge based on the voltage; and
a second touch detecting part adapted to map the voltage and a current due to the touch to a look-up table to detect the touched position.

9. The display apparatus of claim 8, wherein the controller comprises:
a first tactile controlling part adapted to generate a first tactile signal selecting a tactile generator adjacent to the touched position based on the touched position; and
a second tactile controlling part adapted to generate a second tactile signal controlling the tactile generator to generate a tactile sensation having a second intensity based on a first intensity of the touch.

10. The display apparatus of claim 9, further comprising at least one tactile generator connected to the controller and generating the tactile sensation.

11. The display apparatus of claim 10, wherein the tactile generator is one of a vibrator, a piezoelectric actuator, an electro-active polymer (EAP) and an electro-sensory element.

12. A display apparatus comprising: a touch display panel comprising:
an array substrate including a first base substrate and a plurality of pixels formed on the first base substrate, wherein each of the pixels includes a switching element and a pixel electrode connected to the switching element, a touch substrate including a second base substrate having a first surface and a second surface opposite to the first surface, in which the first surface includes a touch area adapted to receive a touch input by a capacitive type touch sensor and a peripheral area outside of the touch area, a first electrode part of the capacitive type touch sensor, a second electrode part of the capacitive type touch sensor disposed on the touch area of the first surface and extending in a second direction crossing the first direction, a pressure detecting element of a pressure detecting type touch sensor disposed on the touch area of the first surface in a crossing area between the first electrode part of the capacitive type touch sensor and the second electrode part of the capacitive type touch sensor and a wiring electrode part including a first wiring electrode connected to an end of the first electrode part of the capacitive type touch sensor and a second wiring electrode connected to an end of the second electrode part of the capacitive type touch sensor;
a liquid crystal layer disposed between the array substrate and the touch substrate;
a protecting substrate disposed over the touch substrate for protecting the touch substrate;
a filled layer disposed between the protecting substrate and the touch substrate and adhering the protecting substrate to the touch substrate;
a common electrode disposed between the touch substrate and the liquid crystal layer; and
a controller connected to the touch display panel and detecting a touched position generated on the touch display panel,
wherein the controller comprises:
an error detecting part adapted to compare a voltage due to a touch with a reference voltage to detect a touching error;
a first touch detecting part adapted to detect the touched position using an amount of an electrical charge based on the voltage; and
a second touch detecting part adapted to map the voltage and a current due to the touch to a look-up table to detect the touched position.

13. The display apparatus of claim 12, wherein the first electrode part comprises a plurality of first main electrodes extending in the first direction, and a plurality of first connecting electrodes connecting the first main electrodes adjacent to each other in the first direction, wherein the second electrode part comprises a plurality of second main electrodes extending in the second direction, and a plurality of second connecting electrodes connecting the second main electrodes adjacent to each other in the second direction, and wherein first sides of ends of the second main electrodes adjacent to each other are disposed substantially parallel to sides of the first connecting electrodes and second sides of the second main electrodes adjacent to each other are disposed substantially parallel to sides of the first main electrodes.

14. The display apparatus of claim 13, wherein the first and second wiring electrodes are each formed of a same material as a material of the first connecting electrode, and wherein the first and second wiring electrodes are formed on a same layer as the first connecting electrodes and disposed under the first main electrodes, so that the first and second wiring electrodes overlap at least partially with the first main electrodes.

* * * * *